(12) United States Patent
Pul (10) Patent No.: US 10,563,637 B2
(45) Date of Patent: Feb. 18, 2020

(54) TWIN M-VAWT (71) Applicant: George Pul, Las Vegas, NV (US)

(72) Inventor: George Pul, Las Vegas, NV (US)

(*) Notice: Subject to any disclaimer, the term of this patent is extended or adjusted under 35 U.S.C. 154(b) by 130 days.

(21) Appl. No.: 15/904,423

(22) Filed: Feb. 26, 2018

(65) Prior Publication Data
US 2019/0264652 A1 Aug. 29, 2019

(51) Int. Cl.
  F03D 3/02 (2006.01)
  F03D 3/06 (2006.01)
  F03D 3/04 (2006.01)
  F03D 3/00 (2006.01)
  F03D 80/70 (2016.01)

(52) U.S. Cl.
  CPC ............ F03D 3/02 (2013.01); F03D 3/005 (2013.01); F03D 3/0436 (2013.01); F03D 3/061 (2013.01); F03D 80/70 (2016.05); F05B 2260/40311 (2013.01); Y02E 10/728 (2013.01); Y02E 10/74 (2013.01)

(58) Field of Classification Search
  CPC .......... F03D 3/02; F03D 3/005; F03D 3/0436; F03D 3/061; F03D 80/70; Y02E 10/74; Y02E 10/728
  See application file for complete search history.

(56) References Cited

U.S. PATENT DOCUMENTS

| 2011/0025070 A1* | 2/2011 | Price ............... | F03D 3/005 290/55 |
| 2013/0177426 A1* | 7/2013 | Juan Andreu ........ | F03D 3/02 416/204 R |
| 2014/0050583 A1* | 2/2014 | Wang ............... | F03D 3/00 416/98 |
| 2015/0322920 A1* | 11/2015 | Jones ............... | F03D 3/005 416/1 |

* cited by examiner

Primary Examiner — Michael C Zarroli (57) ABSTRACT

A Twin M-VAWT of the present invention combines two counter-rotating M-VAWTs, each of which is a multi axes wind turbine disclosed and documented in patent application Ser. No. 15/790,004 filed on Oct. 22, 2017, for improved flexibility in paired planet and sun airfoils shapes and sizes, and for improved power generating performances. Two counter-rotating M-VAWTs are clocked mirror images of one another, where one M-VAWT is a mirror image of the other one before their relative orientations are rotated or clocked from one another; they are located in close proximity to one other; and they cooperate and interact with one another; and with added flexibility in paired planet and sun airfoils shapes and sizes, they achieve improved power generating performances.

3 Claims, 5 Drawing Sheets

TWIN M-VAWT

FIELD

The present invention relates generally to Vertical Axis Wind Turbines (VAWTs), and more particularly, the present invention relates to two counter-rotating Multi-axes VAWTs, or M-VAWTs combined into a Twin M-VAWT, and having multiple planet rotors of a M-VAWT rotate around a stationary sun rotor.

BACKGROUND OF THE INVENTION

A Twin M-VAWT of the present invention combines two counter-rotating M-VAWTs, clocked mirror images of one another, where the two M-VAWTs are mirror images of one another before their orientations are rotated or clocked from one another. A Twin M-VAWT, when compared to two individual and separated M-VAWTs, has flexibility in planet and sun airfoils shapes and sizes, and improved power generating performances through cooperation and interactions between the two combined counter-rotating M-VAWTs, and by having their paired planet and sun airfoils acting alternately as wind shields and diverters.

SUMMARY OF THE INVENTION

A Twin M-VAWT of the present invention consists of two counter-rotating M-VAWTs in proximity of one another, where each M-VAWT comprises a sun rotor assembly, planet rotor assembly, carrier plate assembly, chain drive assembly, and airfoils assembly. Each counter-rotating M-VAWT of a Twin M-VAWT has an airfoils assembly with additional flexibility in its paired planet and sun airfoils shapes and sizes when compared to an M-VAWT disclosed and documented in patent application Ser. No. 15/790,004 filed on Oct. 22, 2017. Two counter-rotating M-VAWTs are clocked mirror images of one another in close proximity, but were mirror images of one another only prior to one mirrored image of M-VAWT is oriented by rotating or clocking half the angle between the sun rotor stationary shaft and two adjacent planet rotor rotating shafts.

A Twin M-VAWT of the present invention, having two counter-rotating M-VAWTs, clocked mirror images of one another in close proximity, is further consisted of: a counter-rotating drive assembly and a base rotating support assembly. The counter-rotating drive assembly is comprised of: twin counter-rotating sprockets with shaft and bearing of same size and rotating at same speed; an identical sprocket fixed mounted to each of two sun stationary shafts; and two drive chains with each drive chain connecting and rotating one counter-rotating sprocket to one sprocket fixed mounted to a sun stationary shaft. A counter-rotating drive assembly requires a rotating mechanism to rotate twin counter-rotating sprockets with shaft and bearing for two counter-rotating M-VAWTs of a Twin M-VAWT; but the rotating mechanism is neither unique nor novel, and is not further described. A base rotating support assembly is comprised of a strong back, a central rotating shaft at the center of a Twin M-VAWT, and bearings. On either end of the strong back are fix mounted the two cantilevered sun stationary shafts of a Twin M-VAWT through bearings that are fixed in all degrees of freedom except free to rotate axially; in between the ends of the strong back is fix mounted a rotating mechanism for twin counter-rotating sprockets with shaft and bearing of the counter rotating drive assembly. The strong back at the center is supported by the central rotating shaft, with one end fixed to the strong back, and the other end grounded in all degrees of freedom except it is free to rotate axially. A base rotating support assembly requires a rotating mechanism to rotate central rotating shaft and orient the twin M-VAWT facing against general straight flowing wind; but the rotating mechanism is neither unique nor novel, and is not further described.

A Twin M-VAWT of the present invention has its X-Y-Z coordinate system centered at the grounded end of the central rotating shaft of the base rotating support assembly, +Z axis vertically up along the central rotating shaft, and +Y axis pointed in the direction of generally straight flowing wind.

A planet airfoil has many features, including: It has a curved segment centered symmetrically about and rotates around its planet rotating shaft. It has a rounded leading edge pointed along X axis away from M-VAWTs mirror image plane, and a thin curved line trailing edge. Its curved segment chord is aligned to X axis, and has a chord width just short of 2× the distance between planet rotating shaft and sun stationary shaft. Its curved segment radius is about the same as the segment chord width, with a center point on a line parallel to Y axis passing through and below its planet rotating shaft. The curved segment is the upper +Y smaller segment. Planet airfoils, translational images of one another, are shaped for a high lift and drag hybrid airfoils.

A sun airfoil has many features, including: Its curved segment is just slightly less than a quarter of a circle, or less than half of a semicircle, centered on or near its planet rotating shaft; and the curved segment is part of the half of a semicircle closer to the sun stationary shaft. Its radius is about the distance between a planet rotating shaft and the sun stationary shaft, and is slightly longer than half the chord width of planet airfoil for positive rotational clearances between them. One curved segment end is at the semicircle mid point; and its other curved segment end is at an angle less than 90 degrees away toward the sun stationary shaft. Rotations of a sun airfoil is in accordance to rotations of its semicircle chord inline to a line connecting the planet rotating shaft to the sun stationary shaft; when a sun airfoil with its semicircle chord is rotated horizontal inline to X axis, its semicircle chord is also inline to its paired planet airfoil curved segment chord, and the sun airfoil projected width on the X axis is approximately half the planet airfoil chord width. Sun airfoils, rotational images of one another, are shaped for high drag airfoils.

In operation, a Twin M-VAWT of the present invention with two counter-rotating M-VAWTs, clocked mirror images of one another, is forward facing in −Y direction with planet airfoils persistently facing against generally straight flowing wind in +Y direction. A M-VAWT, when subjected to generally straight flowing wind, has its planet rotors and paired planet and sun airfoils rotate reciprocally through 2 half rotations separated by a line parallel to Y axis. An outboard planet rotor is a planet rotor rotating through the half rotations further away from the Y axis, and its paired planet and sun airfoils are in half a rotation power cycles. An inboard planet rotor is a planet rotor rotating through the half rotations closer to the Y axis, and its paired planet and sun airfoils are in half a rotation return cycles. Outboard planet rotors and their paired planet and sun airfoils rotate aftward in +Y direction and away from generally straight flowing wind; and inboard planet rotors and their paired planet and sun airfoils rotate forward in −Y direction against and toward generally straight flowing wind. In a return cycle, a planet airfoil is fully or partially shielded from wind, with its inner half shielded by its own paired sun airfoil, and its outer half shielded cooperatively by paired planet and sun airfoils from the other M-VAWT. In a power cycle, a planet airfoil is overwhelmingly exposed to both generally straight flowing winds as well as to airflows created by its own rotations around its sun stationary shaft, making a planet airfoil effectively a high lift and drag hybrid airfoil. Also, paired planet and sun airfoils rotating with inboard planet rotors cooperate and interact to divert and amplify wind away from them toward paired planet and sun airfoils rotating with outboard planet rotors. Subjected to generally straight flowing wind, two counter-rotating M-VAWTs cooperate and interact to shelter planet airfoils from wind with wind shields for reduction of power loss; and they cooperate and interact to amplify wind power to planet airfoils with wind diverters for increased power generation. Forces generated by the combined winds and rotation airflows are centered or nearly centered on planet airfoils and planet rotating shafts, with little or no induce bending moments on planet rotating shafts. And forces applied to a planet rotating shaft rotate it around its sun stationary shaft to generate power, while moments applied to a planet rotating shaft are grounded by its sun stationary shaft, and generate no power.

In summary, a Twin M-VAWT with two combined counter-rotating M-VAWTs produces improved power performances when compared to two individual standalone M-VAWTs. The improvement in power performances in operations are through cooperation and interactions between the two M-VAWTs as well as between paired planet and sun airfoils. Planet airfoils, been high lift and drag hybrid planet airfoils, are shielded in half of a rotation return cycles and exposed in half a rotation power cycles, for effective recovery of both lift and drag induced forces from generally straight flowing wind as well as from airflows created by planet airfoils rotating around sun stationary shafts. For a high lift and drag hybrid planet airfoil, lift and drag induced forces are centered or nearly centered on the planet airfoil and its planet rotating shaft, with little or no induced bending moments on the planet rotating shaft, to improve conversion of lift and drag induced forces into powers generated. Forces applied to a planet rotating shaft rotate it around its sun stationary shaft to generate power, while moments applied to a planet rotating shaft are grounded by its sun stationary shaft, and generate no power. Two counter-rotating M-VAWTs cooperate and interact to turn paired planet and sun airfoils into wind shields in return cycles to shelter planet airfoil of inboard planet rotors from wind. They also cooperate and interact to turn paired planet and sun airfoils of inboard planet rotors into wind diverters in diverting and amplifying wind away from inboard planet rotors toward planet airfoils of outboard planet rotors.

DESCRIPTION OF THE PREFERRED EMBODIMENT

A Twin M-VAWT of the present invention is disclosed by a preferred embodiment, which is a simplified Twin M-VAWT to show with clarity its features and advantages for converting wind power to mechanical and electrical power. These and other features and advantages of the present invention will become more apparent to one skilled in the art from the following description and claims when read in light of the accompanying drawings for the preferred embodiment of a simplified present invention.

Unless otherwise apparent, or stated, directional references, such as "inner," "inward," "outer," "outward," "downward," "upper", "lower" etc., are for non-limiting descriptive purposes and intended to be relative to the orientation of a particular Twin M-VAWT of the present invention as shown in the view of that apparatus. Parts shown in a given FIGURE are generally proportional in their dimensions.

Referring to FIGS. 1 thru 7, preferred embodiment 1 of a Twin M-VAWT of the present invention is consisted of: counter-rotating M-VAWTs 11 and 12, clocked mirror images of one another; counter-rotating drive assembly 7; and base rotating support assembly 8. M-VAWTs 11 and 12 are clocked mirror images of one another, but were mirror images of one another prior to one or the other M-VAWT 11 or 12 is oriented by rotating or clocking 90 degrees. Preferred embodiment 1 has its X-Y-Z coordinate system centered at the grounded end of of the base rotating support assembly 8, +Z axis up along central rotating shaft 82, and +Y axis aligned to generally straight flowing wind; and M-VAWTs 11 and 12 are forward facing in −Y direction against generally straight flowing wind flowing in +Y direction. M-VAWT 11 rotates counter-clockwise shown rotated inline to X axis; and M-VAWT 12 rotates clockwise shown rotated on a line parallel to Y axis and normal to M-VAWT 11.

Counter-rotating M-VAWTs 11 and 12 of preferred embodiment 1 are M-VAWTs, and each M-VAWTs 11 and 12 is comprised of sun rotor assembly 2, planet rotor assembly 3, carrier plate assembly 4, chain drive assembly 5, and airfoils assembly 6. M-VAWTs 11 and 12, clocked mirror images of one another, incorporated the same sun rotor assembly 2, planet rotor assembly 3, carrier plate assembly 4, and chain drive assembly 5 from an original M-VAWT disclosed and documented in patent application Ser. No. 15/790,004 filed on Oct. 22, 2017; and only relevant details of these same assemblies are repeated for ready reference in this patent application for M-VAWTs 11 and 12 of preferred embodiment 1 of the present invention. M-VAWTs 11 and 12 are M-VAWTS having modifications applied particularly to shapes and sizes of paired planet and sun airfoils 61 and 62 of its airfoils assembly 6 from an original M-VAWT; but many relevant details of airfoils assembly 6 remain unchanged, and are repeated for ready reference and completeness in this patent application for M-VAWTs 11 and 12 of preferred embodiment 1 of the present invention. Counter-rotating M-VAWTs 11 and 12 are located in close proximity to each other for effective cooperation and interactions between them and between their paired planet and sun airfoils 61 and 62.

Sun rotor assembly 2 is stationary and is further comprised of sun stationary shaft 21 with mounted drive sprocket 22. Planet rotor assembly 3 rotates around sun rotor assembly 2, and is further comprised of planet rotors 31 and 32, and each planet rotor 31 and 32 has planet rotating shaft 33. Mounted on each planet rotating shaft 33 are: cap plate 34, base plate 35, drive sprocket 36a, follower sprocket 36b, and bearing 37. Planet rotors 31 and 32, been equally spaced on a circumference 180 degrees apart, are at the same radial distance away from sun stationary shaft 21. And each planet rotors 31 and 32 is jointed and supported through bearing 37 to top and bottom carrier plates 41 and 42 of carrier plate assembly 4. Top and bottom carrier plates 41 and 42 rotate around and are jointed and supported through bearings 43 to sun stationary shaft 21. Sun drive sprocket 22, planet drive sprocket 36a, and planet follower sprocket 36b are identical in size and number of teeth.

Figure 4:
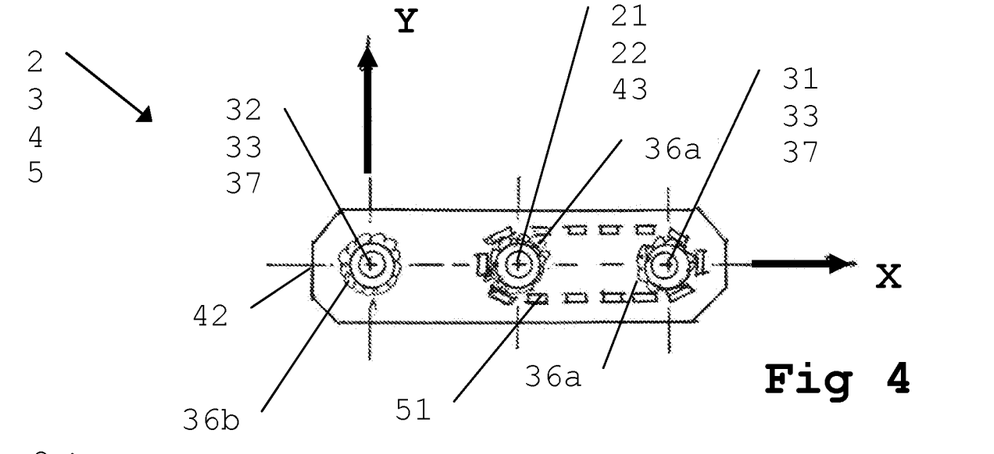
FIG. 4 is a cross section view of the preferred embodiment of the present invention taken along line 4-4 shown in FIG. 2 for part of chain drive assembly 5.
Figure 5:
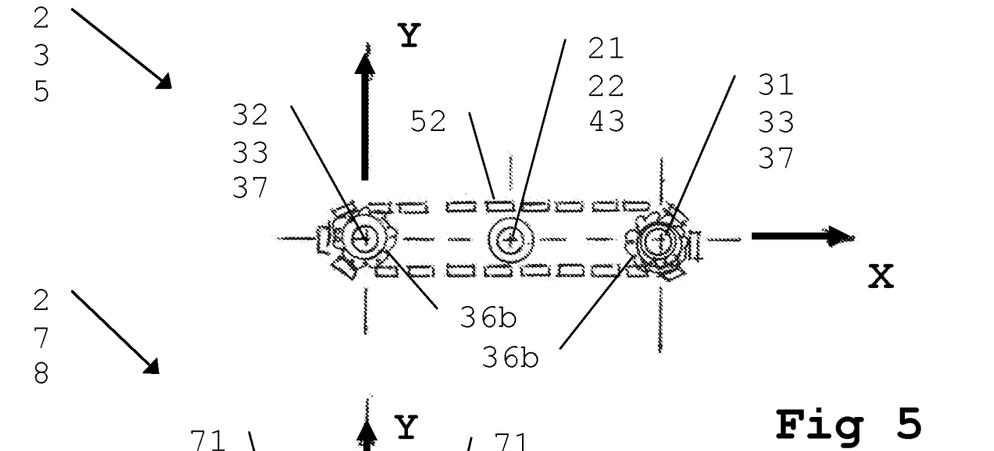
FIG. 5 is a cross section view of the preferred embodiment of the present invention taken along line 5-5 shown also in FIG. 2 for other part of chain drive assembly 5.
Figure 6:
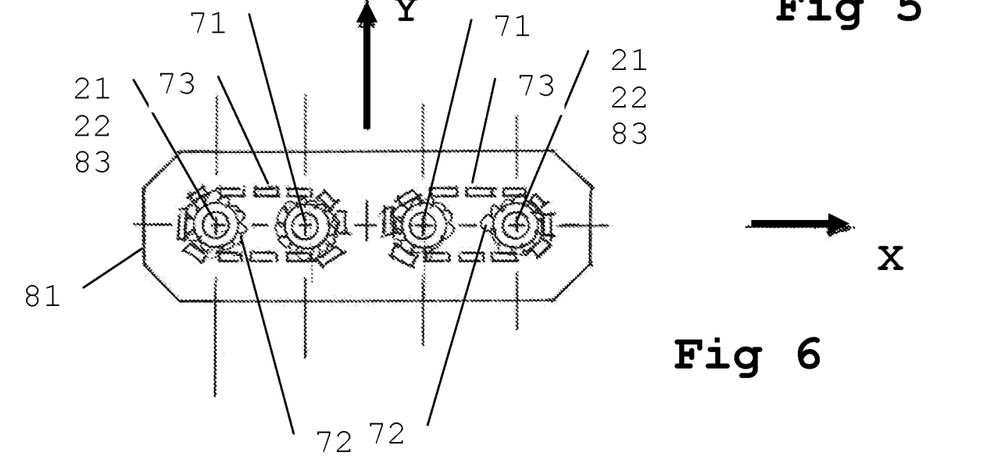
FIG. 6 is a cross section view of the preferred embodiment of the present invention taken along line 6-6 shown also in FIG. 2 for counter-rotating drive assembly 7.

Shown particularly in FIGS. 4, 5, and 6 are chain drive assembly 5 for M-VAWT 11 for driving planet rotors 31 and 32 around sun rotor assembly 2, and counter-rotating drive assembly 7 for counter-rotating M-VAWTs 11 and 12. Chain drive assembly 5 is further comprised of drive chain 51 and follower chain 52. Drive chain 51 connects planet drive sprocket 36a and sun drive sprocket 22 to rotate planet rotor 31 and its planet rotating shaft 33 around sun stationary shaft 21. Planet rotating shaft 33, rotated by drive chain 51, is in a fixed rotational orientation relative to and in rotation around sun stationary shaft 21. Follower chain 52 connects together two follower sprockets 36b, one each on planet rotating shafts 33 of planet rotors 31 and 32, making planet rotor 32 and its planet rotating shaft 33 follow the same rotation and orientation of planet rotor 31 and its planet rotating shaft 33. Chain drive assembly 5 shown in the FIGs for M-VAWT 11 rotate planet rotors 31 and 32 and their planet rotating shafts 33 counter-clockwise around sun rotor assembly 2 and its sun stationary shaft 21, and not shown in the FIGs is its clocked mirror image in clockwise rotations for M-VAWT 12. Counter rotating drive assembly 7 of embodiment 1 comprises twin identical counter-rotating sprockets 71 with integral shaft and bearing, two sprocket 72 with one sprocket 72 fixed mounted to each of two sun stationary shafts 21, and two drive chains 73 with one drive chain 73 each connecting and rotating one sprocket 71 with integral shaft and bearing to one sprocket 72. Counter rotating drive assembly 7 counter-rotates and synchronizes the rotations at the same speed for counter-rotating M-VAWTs 11 and 12, clocked mirror images of one another. A rotating mechanism for counter rotating drive assembly 7 is required for twin counter-rotating sprockets 71 with integral shaft and bearing for rotations of counter-rotate M-VAWTs 11 and 12 of preferred embodiment 1; but it is neither unique nor novel, and is not further described.

Figure 1:
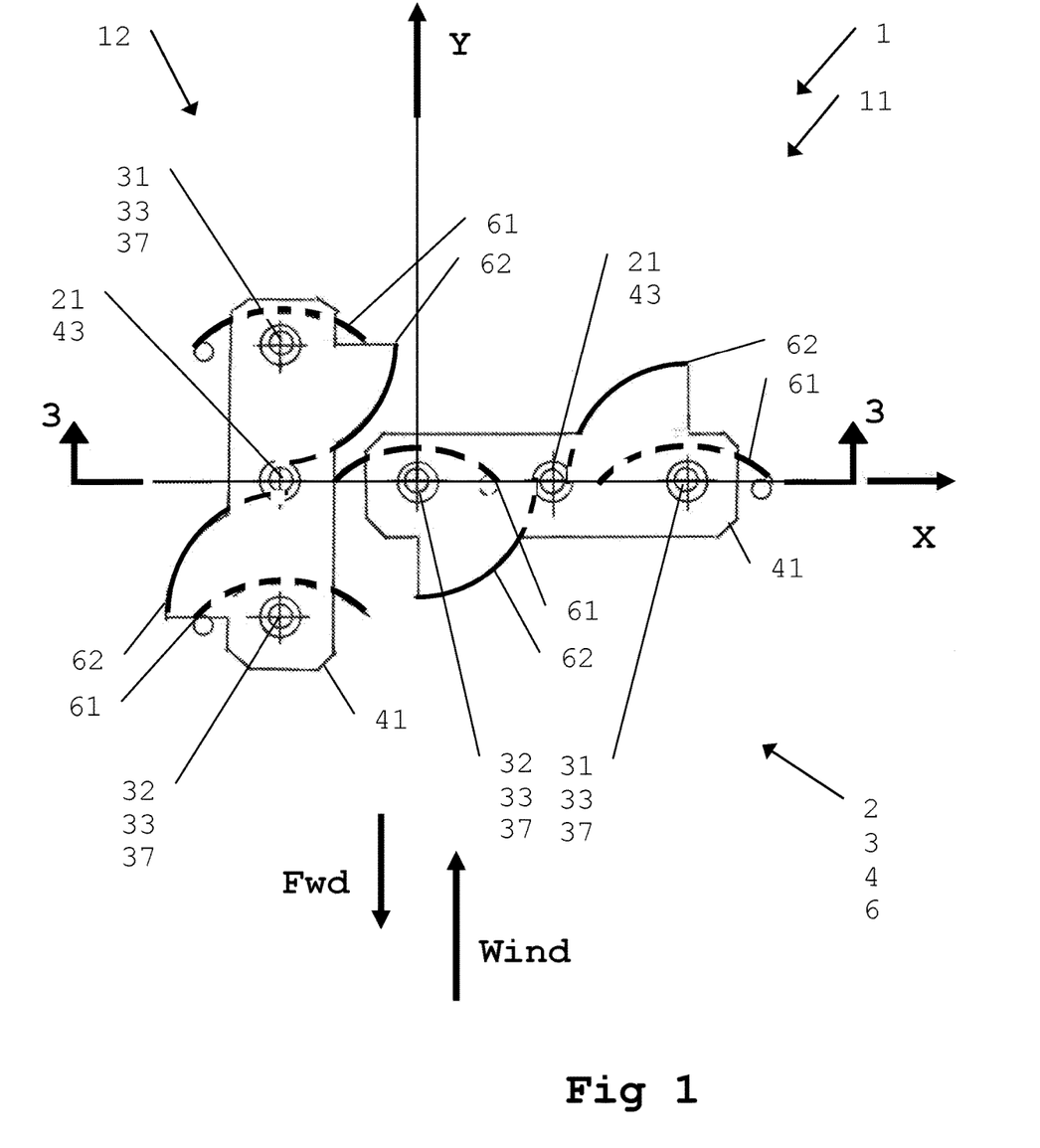
FIG. 1 is a plan view of the preferred embodiment of the present invention; counter-rotating drive assembly 7 and base rotating support assembly 8 not shown for clarity.
Figure 2:
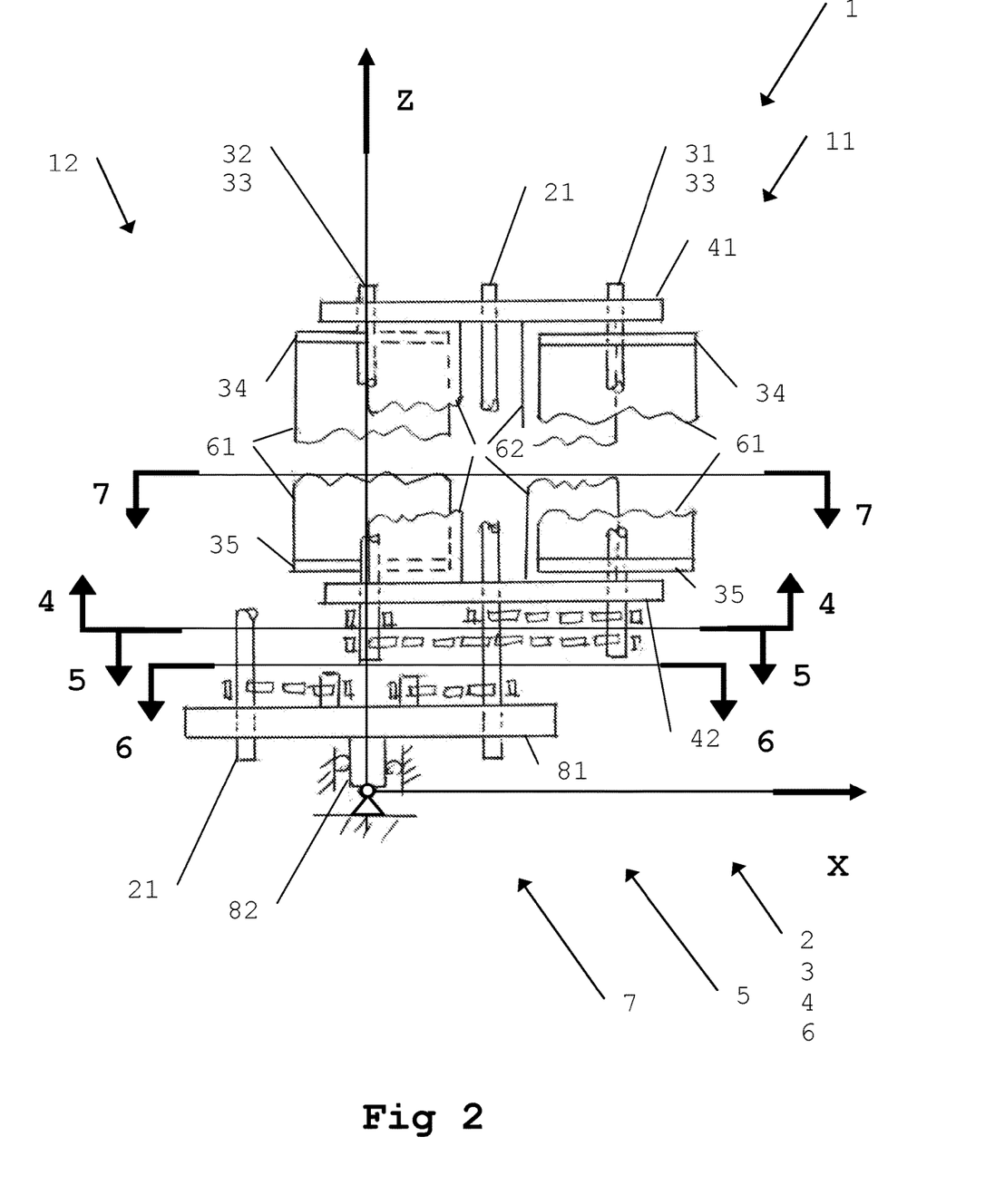
FIG. 2 is an elevation view of the preferred embodiment of the present invention, with M-VAWT 11 shown and M-VAWT 12, been a clocked mirror image, not mostly shown for clarity.
Figure 3:
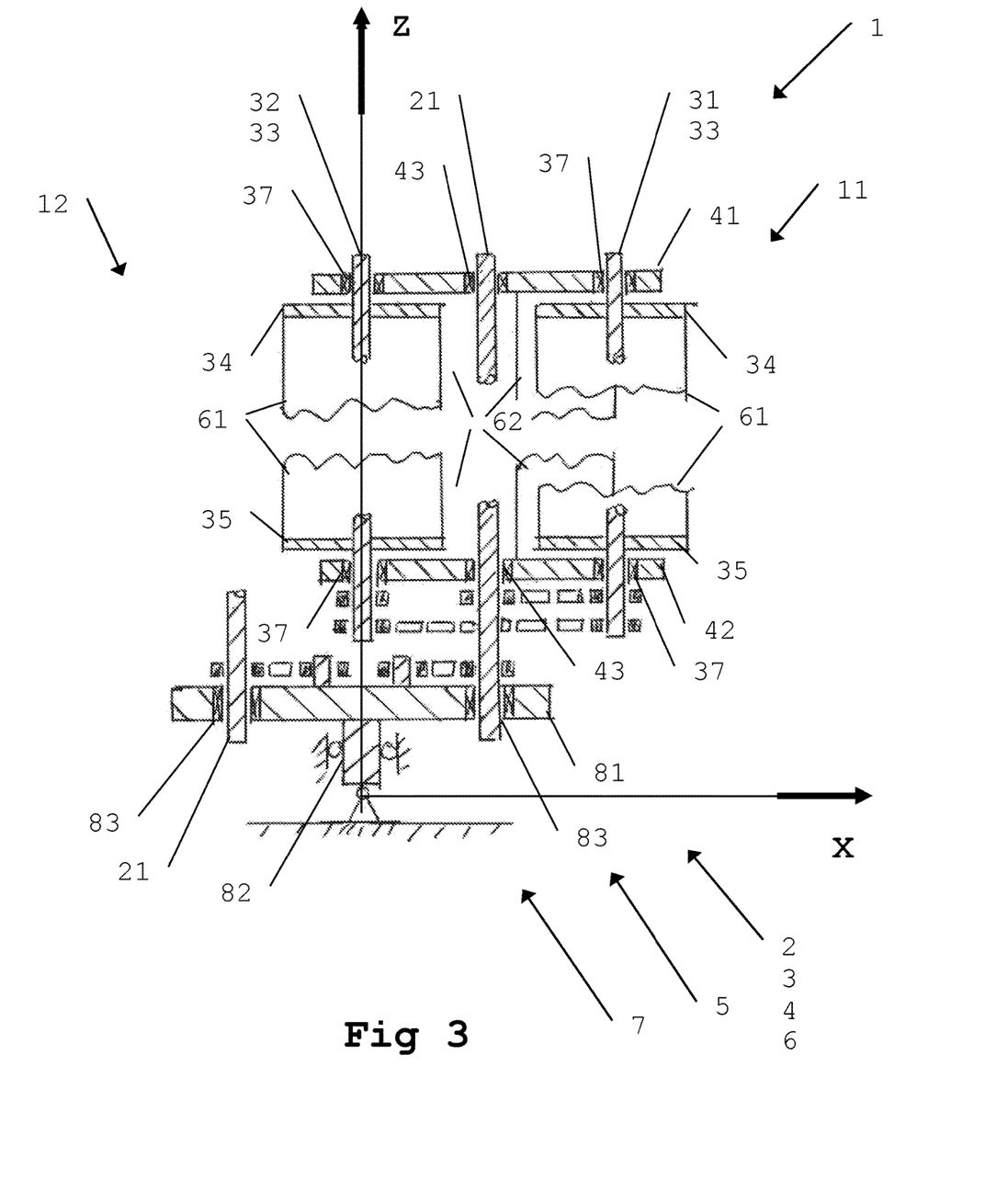
FIG. 3 is a cross section view of the preferred embodiment of the present invention taken along line 3-3 shown in FIG. 1, with M-VAWT 11 shown and M-VAWT 12, been a clocked mirror image, not mostly shown for clarity.

Base rotating support assembly 8 of preferred embodiment 1 shown in FIGS. 2, 3 and 6 comprises strong back 81, central rotating shaft 82, and bearings 83 in supporting and orienting rotationally counter-rotating M-VAWTs 11 and 12 of preferred embodiment 1; and in providing fixed mounting for the rotating mechanism of counter rotating drive assembly 7. On either end of strong back 81 are fix mounted cantilevered sun stationary shafts 21 of M-VAWTs 11 and 12 through bearings 83, fixed in all degrees of freedom except free to rotate axially; in between ends of strong back 81 is mounted a rotating mechanism with twin counter-rotating sprockets 71 with integral shaft and bearing of counter rotating drive assembly 7; and strong back 81 at the center is supported by central rotating shaft 82, with one end fixed to strong back 81, and the other end grounded in all degrees of freedom except free to rotate axially. Central rotating shaft 82 at its grounded end is the center of rotation and origin of X-Y coordinate system of preferred embodiment 1 of the present invention. A rotating mechanism is required for base rotating support assembly 8 to rotate central rotating shaft 82 and orient preferred embodiment 1 to face against general straight flowing wind; but it is neither unique nor novel, and is not further described.

Figure 7:
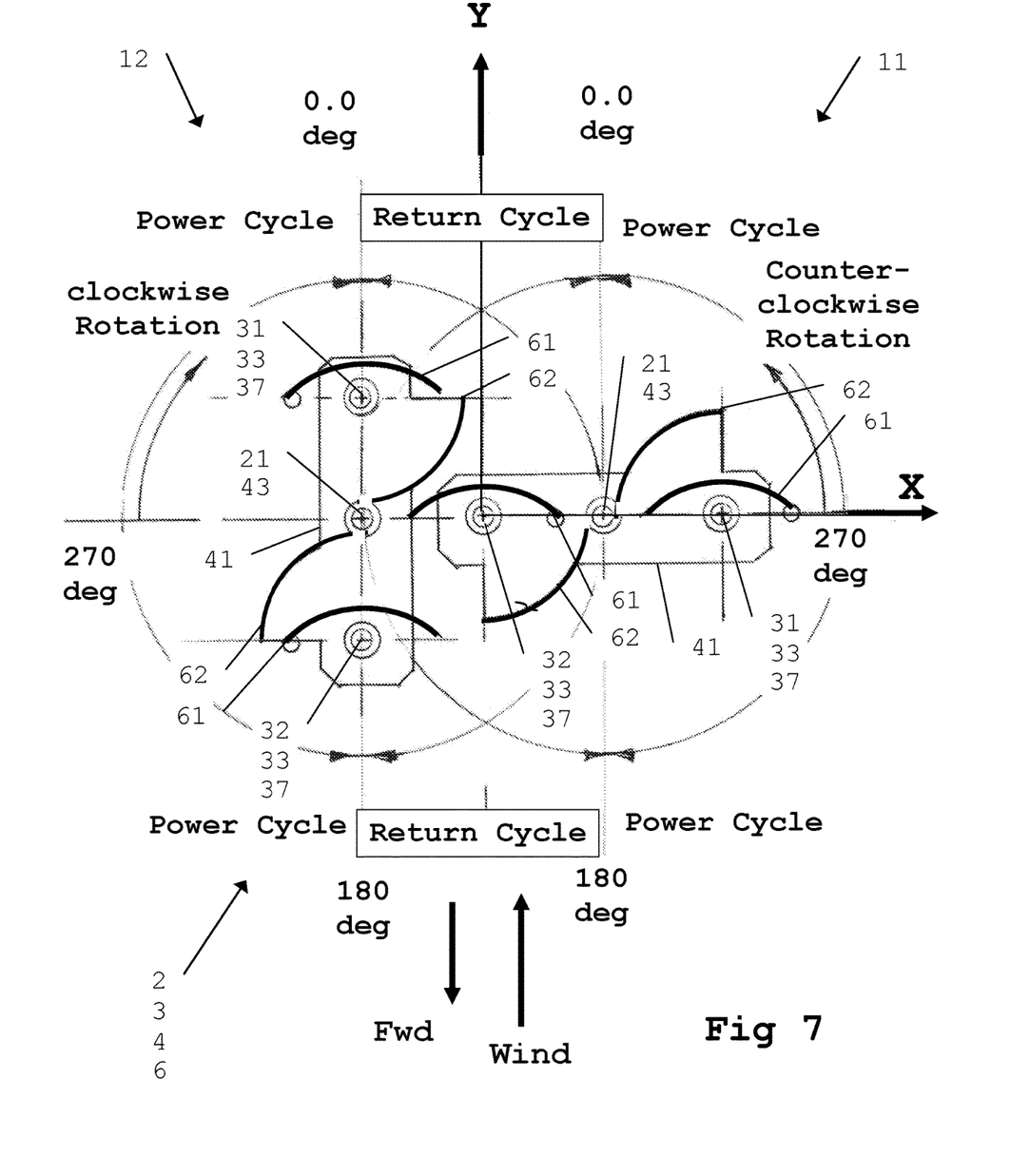
FIG. 7 is a cross section view of the preferred embodiment of the present invention taken along line 7-7 shown also in FIG. 2, with most parts and assemblies removed to show with clarity cooperation and interactions between planet and sun airfoils 61 and 62 of M-VAWTs 11 and 12.

Airfoils assembly 6 shown in FIG. 7 for counter-rotating M-VAWTs 11 and 12, clocked mirror images of one another, is further comprised of paired planet airfoils 61 and sun airfoils 62. Planet airfoils 61, translational images of one another, are fix mounted to cap plates 34 and base plates 35 of planet rotors 31 and 32, rotating with planet rotors 31 and 32 in a fixed rotational orientation relative to and in rotations around sun stationary shaft 21, and facing persistently forward against generally straight flowing wind. Sun airfoils 62, paired to planet airfoils 61, are rotational images of one another, fixed mounted to top and bottom carrier plates 41 and 42 to rotate in a radial alignment around sun stationary shaft 21. Paired planet airfoil 61 and sun airfoil 62, mounted indirectly or directly to top and bottom carrier plates 41 and 42, rotate at the same rate around sun stationary shaft 21.

Continue referring to FIG. 7, paired planet airfoils 61 and sun airfoils 62 are portions of circular curved segments. Planet airfoil 61 is a curved segment in a fixed orientation with its concave surface persistently facing forward against the wind; and it is symmetrically centered about and rotates around its planet rotating shaft 33. It has a rounded leading edge pointed to +X and −X for M-VAWTs 11 and 12, respectively, away from their mirrored plane passing through Y axis; and it has a thin curved line trailing edge. Its curved segment chord is on a line parallel to X axis and passing through its planet rotating shaft 33, and has a chord width just short of 2X the distance between planet rotating shaft 33 and sun stationary shaft 21 for rotational clearance to sun stationary shaft 21. Its curved segment radius is about the same as the segment chord width, with a center point directly below planet rotating shaft 33 in −Y direction. The curved segment is the upper +Y smaller segment. Planet airfoils 61, translational images of one another, are curved segments with rounded leading edges in shapes of high lift and drag hybrid airfoils. Sun airfoil 62 is a curved segment just slightly less than quarter of a circle, or less than half of a semicircle, centered on planet rotating shaft 33, and is part of the half of a semicircle closer to sun stationary shaft 21. Its radius is about the distance between planet rotating shaft 33 and sun stationary shaft 21, and is slightly longer than half the chord width of planet airfoil 61 for positive rotational clearances between paired planet and sun airfoils 61 and 62. One curved segment end is at mid point of the semicircle; and its other curved end is at an angle less than 90 degrees away toward the sun stationary shaft 21. Rotations of sun airfoil 62 is in accordance to rotations of its semicircle chord aligned to a line connecting planet rotating shaft 33 to sun stationary shaft 21; when sun airfoil 62 with its semicircle chord is rotated horizontal inline to X axis, its semicircle chord is also inline to its paired planet airfoil 61 curved segment chord, and sun airfoil 62 projected width on the X axis is approximately half of planet airfoil 61 chord width. Sun airfoils 62, rotational images of one another, are curved segments in shapes of high drag airfoils.

In operation, again referring particularly to FIG. 7, counter-rotating M-VAWTs 11 and 12, clocked mirror images of one another of preferred embodiment 1 of the present invention, are subjected to generally straight flowing wind to counter-clockwise rotate M-VAWT 11 and clockwise rotate M-VAWT 12. Planet rotors 31 and 32 of M-VAWT 11 is shown rotated inline on X axis, and planet rotors 31 and 32 of M-VAWT 12 is shown rotated normal to M-VAWT 11 and aligned parallel to Y axis. Preferred embodiment 1 is forward facing in −Y direction with planet airfoils 61 persistently facing against general straight flowing wind pointing to +Y direction. M-VAWTs 11 and 12, in one rotation, have planet rotors 31 and 32 rotated through two divided half rotations separated by lines aligned and parallel to Y axis through 0 and 180 digress. Relative to Y axis, planet rotors 31 and 32 rotating through outer half rotations are outboard planet rotors 31 and 32 in half a rotation power cycles; and planet rotors 31 and 32 rotating through the inner half rotations are inboard planet rotors 31 and 32 in half a rotation return cycles. Paired planet airfoils 61 and sun airfoils 62 in one rotation around sun stationary shafts 21 reciprocate with planet rotors 31 and 32 from half a rotation power cycle to half a rotation return cycle. In half of a rotation return cycle, planet airfoil 61 is fully or partially shielded from wind, having its inner half shielded by its own paired sun airfoil 62, and its outer half shielded cooperatively by paired planet and sun airfoils 61 and 62 from the other M-VAWT 11 or 12, as appropriate. In half of a rotation power cycle, planet airfoil 61 is overwhelmingly exposed to both generally straight flowing winds as well as to airflows created by planet airfoil 61 rotations around its sun stationary shaft 21; and planet airfoil 61 is effectively turned into a high lift and drag hybrid airfoil. Also, paired planet and sun airfoils 61 and 62 of inboard planet rotors 31 and 32 cooperate and interact to divert and amplify wind away from inboard planet rotors 31 and 32 in half of a rotation return cycles toward outboard planet rotors 31 and 32 in half of a rotation power cycles. Forces generated by the combined winds and rotation airflows are centered or nearly centered on planet airfoils 61 and planet rotating shafts 33, with little or no induce bending moments on planet rotating shafts 33. And forces applied to planet rotating shafts 33 rotate them around sun stationary shafts 21 to generate power, while moments applied to planet rotating shafts 33 are grounded by sun stationary shafts 21, and generate no power.

Power performances of preferred embodiment 1 of the present invention depend on power performances of counter-rotating M-VAWTs 11 and 12 and their paired planet and sun airfoils 61 and 62 in rotations around sun stationary shaft 21 through half a rotation power and return cycles. Power generated as performances of paired planet and sun airfoils 61 and 62, is a function of toque, which is loads X (or multiplied by) bending moment arms; where load, for simplicity, is wind induced load restricted to pointing in +Y direction, without consideration of airflow caused by airfoil rotations; and bending moment arm is the X component of a line connecting planet rotating shaft 33 and sun stationary shaft 21. Peak wind induced torques is at midpoints of half of a rotation power and return cycles on the X axis. At half of a rotation return cycles midpoints on the X axis: the wind induced loads in magnitude is small with planet airfoil 61 fully or partially shielded from wind, and sun airfoil 62 back or convex surface is against wind; the bending moment arm for sun airfoil 62 resisting wind is short; and the total torque is, therefore, small force X short arm. At half of a rotation power cycles midpoints on the X axis: the wind induced load is large with planet airfoil 61 fully exposed to wind; the bending moment arm on planet airfoils 61 is long; and the total torque is, therefore, large force X long arm. In one rotation at midpoints of half of a rotation power cycle, paired planet airfoil 61 and sun airfoil 62 produces a substantial greater torque (large force X long arm) and power produced than torque (small force X short arm) and power lost in half of a rotation return cycle. Power performances for one rotation at midpoints of half of a rotation power and return cycles are indicative and represent reasonably power performances for one rotation through entire half a rotation power and return cycles. Counter-rotating M-VAWTs 11 and 12, clocked mirror images of one another of preferred embodiment 1 of the present invention, in rotations around sun stationary shafts 21 generates a net of substantially more power from wind in half of a rotation power cycles than power lost to wind in half of a rotation return cycles.

Power generating performances for preferred embodiment 1 are further improved by having high lift and drag hybrid planet airfoils 61 shielded in half of a rotation return cycles and exposed in half a rotation power cycles, for effective recovery of both lift and drag induced forces from generally straight flowing wind as well as from airflows created by planet airfoils 61 rotating around sun stationary shafts 21. Power performances are also improved by having wind and rotation airflow generated forces centered or nearly centered on planet airfoils 61 and planet rotating shafts 33, which generate power; while little or no induce bending moments on planet rotating shafts 33, which generate no power. Additionally, power performances are improved by cooperation and interactions between planet and sun airfoils 61 and 62 and between counter-rotating M-VAWTs 11 and 12 in producing wind shields for half of a rotation return cycles to shelter planet airfoil 61 from wind. Cooperation and interactions also produce wind diverters for diverting and amplifying wind away from inboard planet rotors 31 and 32 in half of rotation return cycles toward planet airfoils 61 of outboard planet rotors 31 and 32 in half of a rotation power cycles.

The preferred embodiment described above is for the purpose of describing features and technical conceptions of a simplified Twin M-VAWT of the present invention, consisting most importantly of cooperation and interactions between two counter-rotating M-VAWTs, clocked mirror images of one another. But it should be readily apparent that the invention is not limited to the described preferred embodiment alone, and a person skilled in the art may come up with various changes and modifications consistent to the technical concept disclosed herein and within the spirit and scope of the invention. Prime examples of changes and modifications to the described preferred embodiment include: the number of planet rotors; the shapes, sizes, numbers, and types (lift, drag, or hybrid) of planet and sun airfoils; planet high lift and drag hybrid airfoils assembled from segmented main body, leading edge slats, and trailing edge flaperons; the alternatives to chain drives systems, such as belt drive or gear box drive systems; a Twin M-VAWT is reversible to be a tower fan by been powered to propel wind. A Twin M-VAWT maybe structurally supported at the top by guy wires or other means, and has other structural supports for stabilities and reduced vibrations. Where stated, "wind" is broadly meant to be any fluid medium, including water. Required systems such as power generators, motors, rotation and orientation mechanism, gear boxes, and controls are neither novel nor unique systems, and are not further described in the preferred embodiment of the present invention. Therefore, it is to be understood that modifications and variations may be utilized without departure from the spirit and scope of the invention disclosed herein, as those skilled in the art will readily understand. Such modifications and variations are considered to be within the purview and scope of the claimed invention and their equivalents.

I claim:

1. A Twin M-VAWT (Multi-Vertical Axes Wind Turbine), a wind power generator from generally straight flowing wind, comprising: two counter-rotating $1^{st}$ M-VAWT and $2^{nd}$ M-VAWT, clocked mirror image of one another, and in close proximity to one another; one counter-rotating drive assembly for counter-rotating the two counter-rotating $1^{st}$ M-VAWT and $2^{nd}$ M-VAWT; and a base rotating support assembly for supporting and orienting the Twin M-VAWT to face against wind; a power generator and control system to convert wind power to mechanical or electrical power; and an orientation mechanism and control system to rotate planet airfoils to face against generally straight flowing wind; wherein:
   a) two counter-rotating $1^{st}$ M-VAWT and $2^{nd}$ M-VAWT are clocked mirror images of one another, but they were mirror images of one another prior to 1st M-VAWT is oriented from the 2nd M-VAWT by rotating or clocking 1st M-VAWT by half the angle between a sun stationary shaft and its two adjacent planet rotating shafts;
   b) the base rotating support assembly is further comprised of a central rotating shaft at the center of a Twin M-VAWT, and bearings; and
   c) the Twin M-VAWT has its X-Y-Z coordinate system centered at the grounded end of the central rotating shaft of the base rotating support assembly, with +Z axis vertical up along the central rotating shaft, +Y axis aligned to generally straight flowing wind; and $1^{st}$ M-VAWT and $2^{nd}$ M-VAWT are on the + and − side of X axis, and rotate counter-clockwise and clockwise, respectively, by the counter-rotating drive assembly.

2. A $1^{st}$ M-VAWT and $2^{nd}$ M-VAWT of Twin M-VAWT, comprising clocked mirror image of one another in close proximity to one another, as recited in claim 1, each of which comprising further an airfoils assembly of multiple pairs of planet and sun airfoils that are flexible in shapes and sizes, and these paired planet and sun airfoils cooperate and interact between each other, wherein:
   a) one planet airfoil is mounted to one rotating planet rotor through cap and base plates, the rotating planet rotor is mounted to top and bottom carrier plates, and the one planet airfoil is in a fixed rotational orientation relative to and in rotation around a stationary sun rotor shaft; and one sun airfoil, mounted to the top and bottom carrier plates, and paired to one planet airfoil, is in radial alignment to and in rotation around the stationary sun rotor shaft;
   b) the planet airfoil, translational images of one another in rotations around their stationary sun rotor shaft, is a curved segment shaped similar to a circular curved segment for a high lift and drag hybrid airfoil, where: curved segment is centered symmetrically about and rotates around its planet rotating shaft; its rounded leading edge pointed along X axis away from M-VAWTs' mirror image plane; its curved segment chord is aligned to X axis, and has a chord width just short of 2× the distance between planet rotating shaft and sun stationary shaft; its curved segment radius is about the same as the segment chord width, with a center point on a line parallel to Y axis through and below its planet rotating shaft; and its curved segment is the upper +Y smaller segment; and
   c) the sun airfoil, rotational images of one another in rotations around its sun rotor stationary shaft, is a curved segment shaped similar to a circular curved segment for a high drag airfoil, where: its curved segment is just slightly less than a quarter of a circle, or less than half of a semicircle, centered on or near its planet rotating shaft; its curved segment is part of the half of a semicircle closer to the sun stationary shaft; its curved segment radius is about the distance between a planet rotating shaft and the sun stationary shaft, and is slightly longer than half the chord width of a planet airfoil for positive rotational clearances between them; one of its curved segment end is at the semicircle mid-point, and its other curved segment end is at an angle less than 90 degrees away toward the sun stationary shaft; rotations of a sun airfoil is in accordance to rotations of its semicircle chord aligned to a line connecting the planet rotating shaft to the sun stationary shaft; when a sun airfoil with its semicircle chord is rotated horizontal inline to X axis, its semicircle chord is also inline to its paired planet airfoil curved segment chord, and the sun airfoil projected width on the X axis is approximately half the planet airfoil cord width;
   d) the paired planet and sun airfoils are mounted indirectly or directly to the carrier plates, and have the same rotational rate around the sun rotor stationary shaft; a sun airfoil makes one rotation around its paired planet airfoil without interference in every one rotation around the sun rotor stationary shaft; and the paired planet and sun airfoils are sized to be freely rotating;
   e) in one rotation around the sun rotor stationary shaft, paired planet and sun airfoils move through a reciprocal half a rotation power and return cycles, where: the half a rotation power and return cycles are where planet airfoils face toward and away from applied wind; in rotations, the planet airfoils with paired sun airfoils that have rotated away are always facing against applied generally straight flowing wind; the sun airfoils with paired planet airfoils having rotated away are rotated by generally straight flowing applied wind from any direction; and in combination, the paired planet and sun airfoils alternate as wind shields in rotations, particularly in return cycles.

3. In operation, a wind power generating Twin M-VAWT have effective cooperation and interaction between paired planet and sun airfoils, as recited in claim 1, as well as having effective cooperation and interaction between $1^{st}$ M-VAWT and $2^{nd}$ M-VAWT, wherein:
   a) For each $1^{st}$ M-VAWT and $2^{nd}$ M-VAWT, multiple planet rotors and paired planet and sun airfoils rotate reciprocally through 2 half rotations separated by a line parallel to Y axis and through the sun stationary shaft; an outboard planet rotor is a planet rotor rotating through the half rotations further away from the Y axis, and its paired planet and sun airfoils are in half a rotation power cycles; an inboard planet rotor is a planet rotor rotating through the half rotations closer to the Y axis, and its paired planet and sun airfoils are in half a rotation return cycles; outboard planet rotors and their paired planet and sun airfoils rotate aft ward in +Y direction and away from generally straight flowing wind; and inboard planet rotors and their paired planet and sun airfoils rotate forward in −Y direction against and toward generally straight flowing wind;

b) in a return cycle, paired planet and sun airfoils produce greatly reduced and minimum wind induced loads, particularly at midpoints of the return cycle, by having planet and sun airfoils alternating as wind shields to be fully or partially shielded from generally straight flowing wind; a planet airfoil is fully or partially shielded from wind, having its inner half shielded by its own paired sun airfoil, and its outer half shielded cooperatively by paired planet and sun airfoils from the other $1^{st}$ M-VAWT or $2^{nd}$ M-VAWT; a sun airfoil has its back or convex surface facing against wind for low wind induced loads and power loss; and paired planet and sun airfoils rotating with inboard planet rotors are rotating in cooperation and in interactions to divert and amplify wind away from them toward paired planet and sun airfoils rotating with outboard planet rotors; and at midpoints of return cycles, paired planet and sun airfoils have both minimum wind induced loads and longer bending moment arms;

in a power cycle, paired planet and sun airfoils produce maximum wind induced loads, particularly at midpoints of power cycles, by having planet airfoils persistently facing and fully exposed to the applied generally straight flowing wind as well as to airflows created by planet airfoils own rotations around its sun stationary shaft, making a planet airfoil effectively a high lift and drag hybrid airfoil; away from midpoints of power cycles toward end points of power and return cycles, high lift and drag planet airfoils produce additional wind induced lift loads; forces generated by the combined winds and rotation airflows are centered or nearly centered on planet airfoils and planet rotating shafts; and forces rotating planet rotating shafts around the sun stationary shaft generate power; and at midpoints of power cycles, paired planet and sun airfoils have both maximum wind induced loads and longer bending moment arms;

c) the paired planet and sun airfoils in rotation around a stationary sun rotor are measured for performance by power generated, with power generated related to torques equal to loads X bending moment arms, where: at mid-points of the power and return cycle, power generated is substantially more for power cycles (maximum loads X longer arms) than the power lost during return cycles (minimum loads X shorter arms); and power generated at mid-points of power and return cycles represent their performances during complete rotations through power and return cycles; and d) the Twin M-VAWT with mounted paired planet and sun airfoils generates a net power from generally straight flowing wind; and can be operated in reverse, with power motors replacing generators, and with paired planet and sun airfoils rotating in reverse, Twin M-VAWT propels a substantial volume of generally straight flowing wind or airflow.

\* \* \* \* \*